United States Patent
Ichimaru

(10) Patent No.: US 8,929,642 B2
(45) Date of Patent: Jan. 6, 2015

(54) THREE-DIMENSIONAL SCANNER AND ROBOT SYSTEM

(75) Inventor: Yuji Ichimaru, Fukuoka (JP)

(73) Assignee: Kabushiki Kaisha Yasakawa Denki, Kitakyushu-Shi (JP)

( * ) Notice: Subject to any disclaimer, the term of this patent is extended or adjusted under 35 U.S.C. 154(b) by 387 days.

(21) Appl. No.: 13/412,556

(22) Filed: Mar. 5, 2012

(65) Prior Publication Data

US 2012/0263347 A1 Oct. 18, 2012

Related U.S. Application Data

(60) Provisional application No. 61/475,230, filed on Apr. 14, 2011.

(30) Foreign Application Priority Data

Apr. 14, 2011 (JP) .................... 2011-090167

(51) Int. Cl.
  *G06K 9/00* (2006.01)
  *G06T 7/00* (2006.01)
  *G01B 11/25* (2006.01)
  *B23Q 17/20* (2006.01)

(52) U.S. Cl.
  CPC ............ *G01B 11/2518* (2013.01); *G01B 11/25* (2013.01)
  USPC ........... 382/152; 382/103; 382/106; 382/153; 356/302; 356/306; 356/309; 356/3.1; 356/601; 356/602; 356/606; 356/608; 702/159

(58) Field of Classification Search
  CPC ..... G06T 1/0014; G06T 7/0004; G06T 7/004; G06T 7/0073; G06T 7/0051; G06T 7/0057; G01B 11/25; G01B 11/2518; B25J 9/1697; B25J 11/005; B25J 13/08; B25J 19/02; B25J 19/021; B25J 19/022; B25J 19/023; G05B 2219/37048; B23Q 17/24; B23Q 17/2414; B23Q 17/2419
  USPC ........ 382/152, 103, 106, 153; 356/3.02, 3.06, 356/3.09, 31, 601, 602, 606, 608; 702/159
  See application file for complete search history.

(56) References Cited

U.S. PATENT DOCUMENTS 4,575,304 A * 3/1986 Nakagawa et al. ........... 414/730
5,046,852 A * 9/1991 Hametner et al. ............ 356/398

(Continued)

FOREIGN PATENT DOCUMENTS

JP 07-270137 10/1995

OTHER PUBLICATIONS

Extended European Search Report for corresponding EP Application No. 12157489.1—2213, Aug. 29, 2012.

*Primary Examiner* — Michael A Newman
(74) *Attorney, Agent, or Firm* — Mori & Ward, LLP

(57) ABSTRACT

A three-dimensional scanner according to one aspect of the embodiments includes an irradiation unit, an imaging unit, a position detecting unit, and a scanning-region determining unit. The irradiation unit emits a slit-shaped light beam while changing an irradiation position with respect to a measuring object. The imaging unit sequentially captures images of the measuring object irradiated with the light beam. The position detecting unit detects a position of the light beam in an image captured by the imaging unit by scanning the image. The scanning-region determining unit determines a scanning region in an image as a scanning target by the position detecting unit based on a position of the light beam in an image captured by the imaging unit before the image as a scanning target.

7 Claims, 9 Drawing Sheets

(56) References Cited

U.S. PATENT DOCUMENTS

| | | | |
|---|---|---|---|
| 5,102,224 A * | 4/1992 | Uesugi et al. | 356/607 |
| 6,141,105 A * | 10/2000 | Yahashi et al. | 356/623 |
| 6,233,049 B1 * | 5/2001 | Kondo et al. | 356/623 |
| 6,268,918 B1 * | 7/2001 | Tanabe et al. | 356/602 |
| 7,151,568 B2 * | 12/2006 | Kawachi et al. | 348/302 |
| 7,591,078 B2 | 9/2009 | Crampton | |
| 2002/0036779 A1 * | 3/2002 | Kiyoi et al. | 356/606 |
| 2004/0240754 A1 | 12/2004 | Smith et al. | |
| 2010/0085577 A1 * | 4/2010 | Kostka et al. | 356/610 |
| 2010/0131235 A1 * | 5/2010 | Aoba | 702/153 |
| 2010/0328454 A1 * | 12/2010 | Yamada | 348/135 |

\* cited by examiner

THREE-DIMENSIONAL SCANNER AND ROBOT SYSTEM

CROSS-REFERENCE TO RELATED APPLICATION

This application is based upon and claims the benefit of priority of the prior U.S. Provisional Patent Application No. 61/475,230, filed on Apr. 14, 2011, the entire contents of which are incorporated herein by reference.

FIELD

The embodiments discussed herein are directed to a three-dimensional scanner and a robot system.

BACKGROUND

Conventionally, there is a three-dimensional scanner that measures a three-dimensional shape of an object (for example, see Japanese Patent Laid-open Publication No. H07-270137). This three-dimensional scanner, for example, emits a slit-shaped light beam to a measuring object while changing an irradiation position with respect to the measuring object and sequentially captures images of the measuring object irradiated with the light beam by a camera.

Next, the three-dimensional scanner detects the position of the light beam in an image by reading out image information on the captured image from photodetectors of the camera and scanning all pixels of the captured image.

Then, the three-dimensional scanner measures the three-dimensional shape of the measuring object by calculating the height of each portion of the measuring object by the principle of triangulation using an irradiation angle and an acceptance angle of the light beam and the distance from a light source of the light beam to the camera.

SUMMARY

A three-dimensional scanner according to an aspect of an embodiment includes an irradiation unit, an imaging unit, a position detecting unit, and a scanning-region determining unit. The irradiation unit emits a slit-shaped light beam while changing an irradiation position with respect to a measuring object. The imaging unit sequentially captures images of the measuring object irradiated with the light beam. The position detecting unit detects a position of the light beam in an image captured by the imaging unit by scanning the image. The scanning-region determining unit determines a scanning region in an image as a scanning target by the position detecting unit based on a position of the light beam in an image captured by the imaging unit before the image as a scanning target.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, embodiments of a three-dimensional scanner and a robot system disclosed in the present application will be described in detail with reference to the accompanying drawings. The present invention is not limited to illustrative of the embodiments described below. Moreover, in the followings, an embodiment of the three-dimensional scanner and an embodiment of the robot system including the three-dimensional scanner are explained as a first embodiment and a second embodiment, respectively.

(First Embodiment)

Figure 1A:
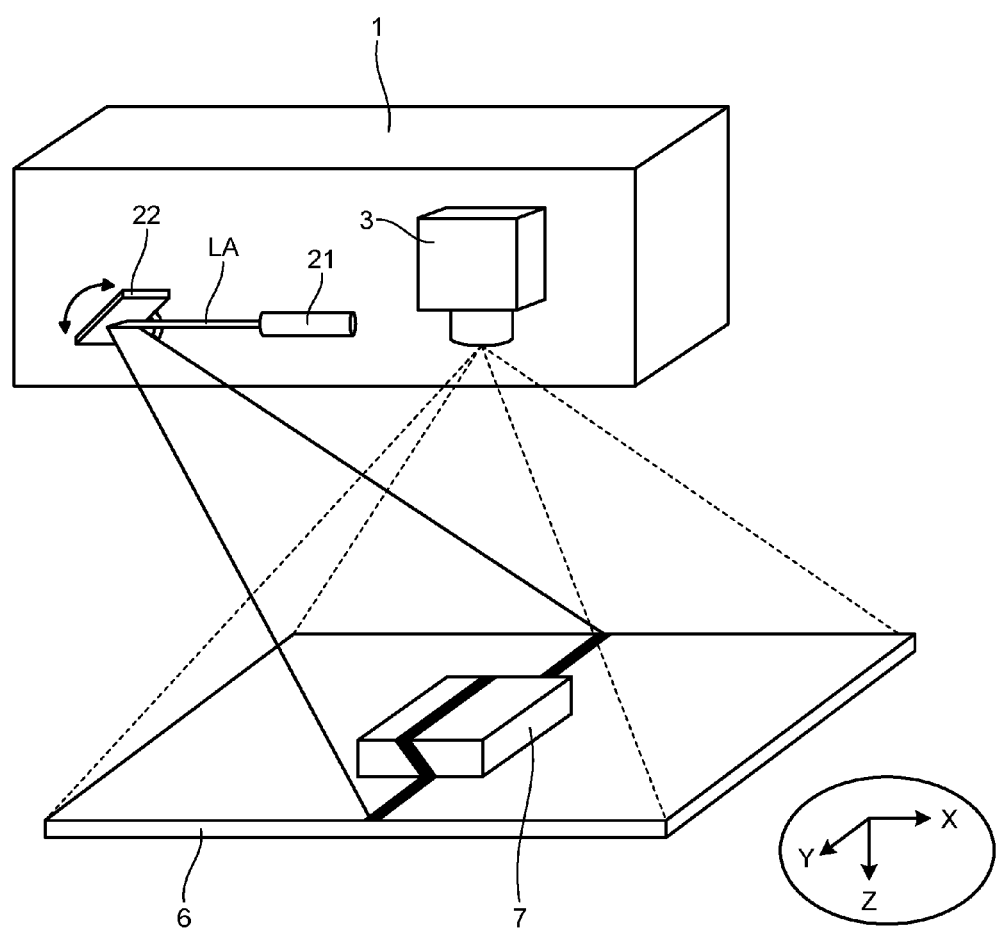
FIG. 1A is a diagram illustrating a positional relationship between a three-dimensional scanner and a measuring object according to a first embodiment.
Figure 1B:
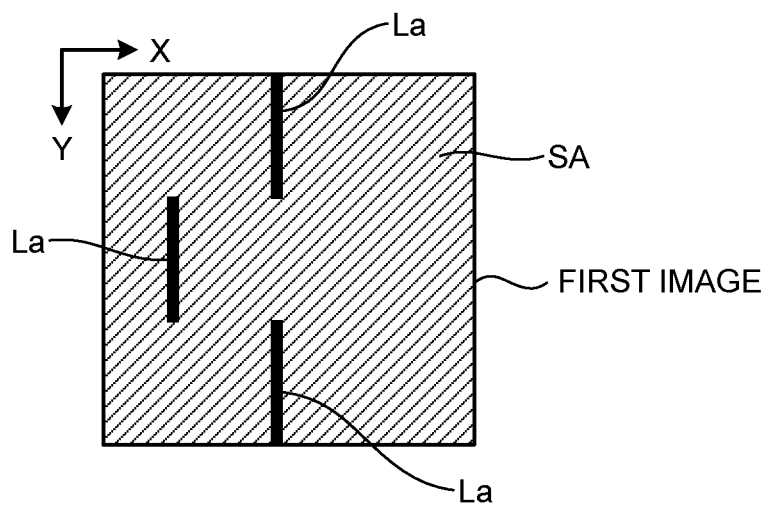
FIG. 1B to FIG. 1C are diagrams illustrating an example of an image captured by an imaging unit of the three-dimensional scanner according to the first embodiment.
Figure 1C:
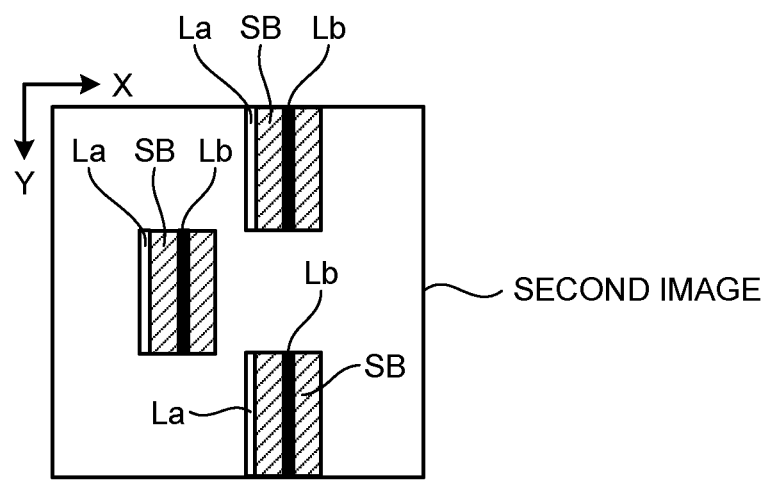

First, a three-dimensional scanning method according to the first embodiment is explained with reference to FIG. 1A, FIG. 1B, and FIG. 1C. FIG. 1A is a diagram illustrating a positional relationship between a three-dimensional scanner 1 and a measuring object 7 according to the first embodiment, and FIG. 1B to FIG. 1C are diagrams illustrating an example of an image captured by an imaging unit 3 of the three-dimensional scanner 1 according to the first embodiment.

In the followings, an XY coordinate system as a Cartesian coordinate system is provided on a placement surface on which the measuring object 7 is placed and a vertically-downward direction from the placement surface is defined as a Z axis for easy understanding of the explanation. In the followings, explanation is made for a case where a rectangular parallelepiped to be placed on a stage 6 to be the placement surface of the measuring object 7 is the measuring object 7 and the three-dimensional shape of the measuring object 7 is measured by the three-dimensional scanner 1 from the vertically-upward direction.

As shown in FIG. 1, in the three-dimensional scanning method according to the first embodiment, the three-dimensional scanner 1 emits a slit-shaped light beam (hereinafter, described as "laser LA") toward a mirror 22 from a laser device 21.

Next, the three-dimensional scanner 1 emits the laser LA to the measuring object 7 while changing an irradiation position with respect to the measuring object 7 by rotating the mirror 22. The three-dimensional scanner 1 emits the laser LA from a diagonally-upward direction with respect to the measuring object 7 while moving the irradiation position of the laser LA on the measuring object 7 toward a positive direction from a negative direction of the X axis.

Then, the three-dimensional scanner 1 sequentially captures images of the measuring object 7, which is irradiated with the laser LA, by the imaging unit 3. That is, the imaging unit 3 images the laser LA moving on the stage 6 and the measuring object 7 in a moving direction for each imaging flame by receiving the laser LA reflected by the stage 6 and the measuring object 7.

Then, the three-dimensional scanner 1 detects the position (hereinafter, described as "laser position") of the laser LA in each image captured by the imaging unit 3 and measures the three-dimensional shape of the measuring object 7 by the principle of triangulation using the detected laser positions.

For example, when a second image shown in FIG. 1C is captured after a first image shown in FIG. 1B is captured by the imaging unit 3, for the first image, the three-dimensional scanner 1 detects a laser position La in the image by scanning the image with the whole image as a scanning region SA as shown in FIG. 1B.

At this time, the three-dimensional scanner 1 scans all pixels of the first image while sequentially moving a scanning start position in each scanning in a scanning direction, which is a direction parallel to the positive direction of the X axis, in a direction parallel to a positive direction of the Y axis.

As will be described later, the imaging unit 3 includes a plurality of photodetectors arrayed on a light receiving surface, and the arrangement posture of the imaging unit 3 is adjusted in advance so that the array direction (in this example, X-axis direction) of the photodetectors matches the moving direction of the laser LA.

Then, the three-dimensional scanner 1 reads out information on luminance of each pixel in an image from all photodetectors included in the imaging unit 3 and compares luminance of each pixel with a predetermined threshold for each pixel line arrayed in the scanning direction.

Next, the three-dimensional scanner 1 detects the position of the brightest pixel among pixels, whose luminance exceeds a predetermined threshold in each pixel line, as the position La of the laser LA in the first image. It is possible to obtain a luminance profile of pixels, whose luminance exceeds a predetermined threshold, and calculates the laser position La with sub-pixel accuracy by a center-of-gravity calculation process.

On the other hand, when scanning the second image, as shown in FIG. 1C, the three-dimensional scanner 1 detects a laser position Lb in the second image by selectively reading out information on luminance of each pixel from photodetectors corresponding to a scanning region SB narrower than the case of scanning the first image and scanning pixels in the scanning region SB.

That is, in the three-dimensional scanning method according to the first embodiment, the laser LA is moved on the stage 6 and the measuring object 7 in the positive direction of the X axis. Therefore, the laser position Lb in the second image is detected on the positive side of the X axis with respect to the laser position La in the first image. In other words, the laser position Lb in the second image is not detected on the negative side of the X axis with respect to the laser position La in the first image.

Moreover, in the three-dimensional scanning method according to the first embodiment, it is possible to roughly estimate a moving distance of the laser LA moving on the stage 6 and the measuring object 7 until the second image is captured after the first image is captured based on the rotation speed of the mirror 22.

Therefore, in the three-dimensional scanning method according to the first embodiment, when scanning the second image, the laser position La in the first image is determined as a scanning start position and the position, which is away from the scanning start position in the scanning direction by a predetermined distance determined based on the estimated moving distance of the laser LA, is determined as a scanning end position.

Consequently, in the three-dimensional scanning method according to the first embodiment, when scanning the second image, the laser position Lb in the second image can be detected by selectively reading out information on luminance of pixels from photodetectors smaller in number than the case of scanning the first image and scanning each pixel.

Accordingly, in the three-dimensional scanning method according to the first embodiment, the time required for a process of reading out information on luminance of pixels from the imaging unit 3 and a detecting process of a laser position in an image can be shortened, so that a measuring process of a three-dimensional shape can be accelerated.

Moreover, according to the three-dimensional scanning method in the first embodiment, because a scanning region for detecting a laser position can be appropriately limited and determined, when ambient light or the like enters a region outside the determined scanning region, the ambient light or the like is not falsely detected as the laser LA.

Moreover, in the three-dimensional scanning method according to the first embodiment, when scanning third and subsequent images captured by the imaging unit 3, a scanning region in the third image is determined based on the laser position La in the first image and the laser position Lb in the second image. This point will be described later with reference to FIG. 4C.

Figure 2:
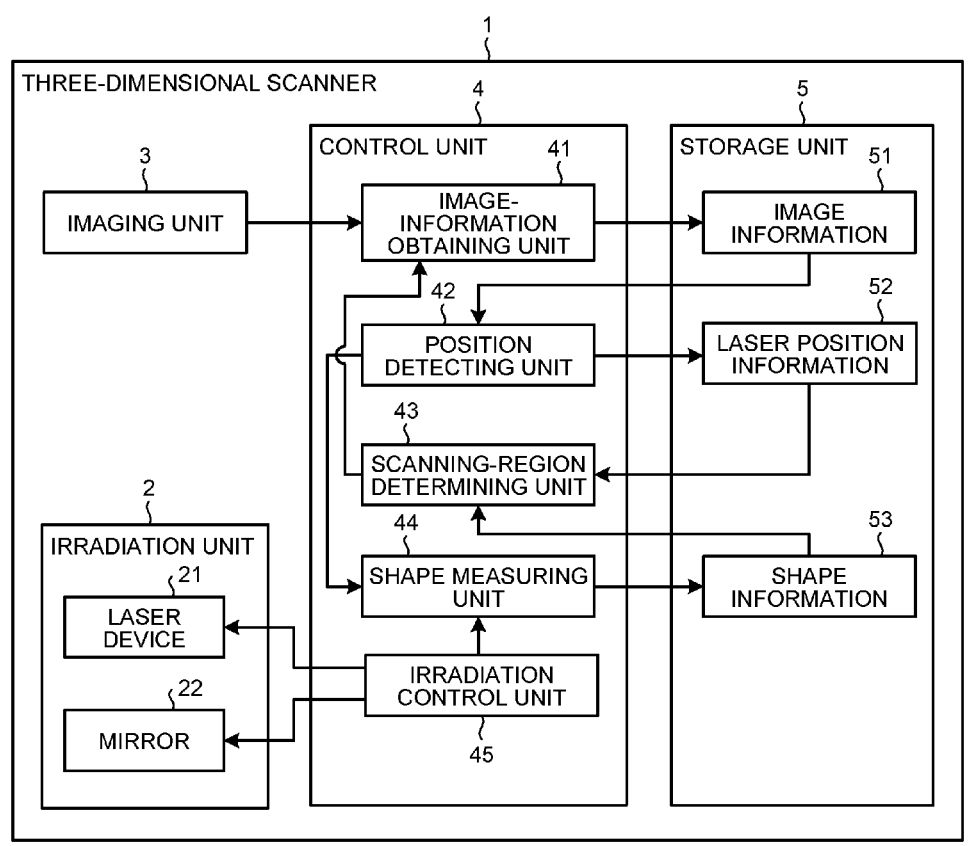
FIG. 2 is a block diagram illustrating the configuration of the three-dimensional scanner according to the first embodiment.

Next, the configuration of the three-dimensional scanner 1 according to the first embodiment is explained with reference to FIG. 2. FIG. 2 is a block diagram illustrating the configuration of the three-dimensional scanner 1 according to the first embodiment. As shown in FIG. 2, the three-dimensional scanner 1 includes an irradiation unit 2, the imaging unit 3, a control unit 4, and a storage unit 5.

The irradiation unit 2 is a device that emits the laser LA while changing an irradiation position with respect to the stage 6 and the measuring object 7 according to control by the control unit 4. The irradiation unit 2 includes the laser device 21 and the mirror 22.

The laser device 21 is a device that emits the laser LA as a slit-shaped light beam to the reflecting surface of the mirror 22 based on a control signal input from the control unit 4. Moreover, the mirror 22 is a reflective plate that emits the laser LA emitted from the laser device 21 so that an irradiation position on the stage 6 and the measuring object 7 moves from the negative direction to the positive direction of the X axis, by controlling rotation of the reflecting surface based on the control signal input from the control unit 4.

The imaging unit 3 is a camera including a CMOS (Complementary Metal Oxide Semiconductor) sensor as photodetectors. The imaging unit 3 sequentially captures images of the stage 6 and the measuring object 7 irradiated with the laser LA, and outputs the captured images to the control unit 4. As the photodetectors of the imaging unit 3, any image sensor, such as a CCD (Charge Coupled Device) sensor, can be applied instead of a CMOS sensor.

The storage unit 5 is a storage device that stores image information 51, laser position information 52, shape information 53, and the like. The image information 51 is information indicating an image captured by the imaging unit 3 and the laser position information 52 is information indicating a laser position in each image captured by the imaging unit 3. The shape information 53 is information indicating the three-dimensional shape of the measuring object 7 measured by the three-dimensional scanner 1.

The control unit 4 is a processing unit that collectively controls the operation of the whole three-dimensional scanner 1 and includes an image-information obtaining unit 41, a position detecting unit 42, a scanning-region determining unit 43, a shape measuring unit 44, and an irradiation control unit 45.

The irradiation control unit 45 is a processing unit that outputs a control signal instructing emission of the laser LA to the laser device 21 and outputs a control signal instructing the rotation angle of the reflecting surface to the mirror 22. Moreover, the irradiation control unit 45 outputs information indicating the rotation angle of the mirror 22 to the shape measuring unit 44.

The image-information obtaining unit 41 is a processing unit that obtains images sequentially captured by the imaging unit 3 from the imaging unit 3 and stores them in the storage unit 5 as the image information 51. The image-information obtaining unit 41 selectively reads out and obtains information on luminance of pixels from photodetectors corresponding to a scanning region input from the scanning region determining unit 43 among all photodetectors of the imaging unit 3, as the image information 51.

The position detecting unit 42 is a processing unit that detects a laser position in each of images sequentially captured by the imaging unit 3 based on the image information 51 read out from the storage unit 5. The position detecting unit 42 scans pixels in a scanning region determined by the scanning-region determining unit 43.

Then, the position detecting unit 42 detects the position of the brightest pixel in an image among pixels, whose luminance exceeds a predetermined threshold among scanned pixels, as a laser position in each image and outputs a detection result to the shape measuring unit 44, and stores the detection result in the storage unit 5 as the laser position information 52. A detection example of a laser position by the position detecting unit 42 is described later with reference to FIG. 4A, FIG. 4B, and FIG. 4C.

The scanning region determining unit 43 is a processing unit that determines a scanning region in an image as a scanning target by using a laser position in an image captured by the imaging unit 3 before the image as a scanning target by the position detecting unit 42 based on the laser position information 52 read out from the storage unit 5.

The scanning region determining unit 43 determines each scanning region for each pixel line (hereinafter, described as "line") to be scanned in the scanning direction by the position detecting unit 42 for each image and outputs information indicating the determined scanning region to the image-information obtaining unit 41. A determination example of a scanning region by the scanning region determining unit 43 will be described later with reference to FIG. 4A, FIG. 4B, and FIG. 4C.

Moreover, the scanning region determining unit 43 corrects a scanning region according to a distance (hereinafter, described as "height of the measuring object 7") in a normal direction in an image of the measuring object 7 based on the shape information 53 read out from the storage unit 5. This point will be described later with reference to FIG. 6A, FIG. 6B, FIG. 6C, FIG. 7A, FIG. 7B, and FIG. 7C.

The shape measuring unit 44 is a processing unit that measures the three-dimensional shape of the measuring object 7 by the principle of triangulation based on a laser position in each image input from the position detecting unit 42 and the rotation angle of the mirror 22 input from the irradiation control unit 45. The shape measuring unit 44 stores the measured three-dimensional shape of the measuring object 7 in the storage unit 5 as the shape information 53.

Figure 3:
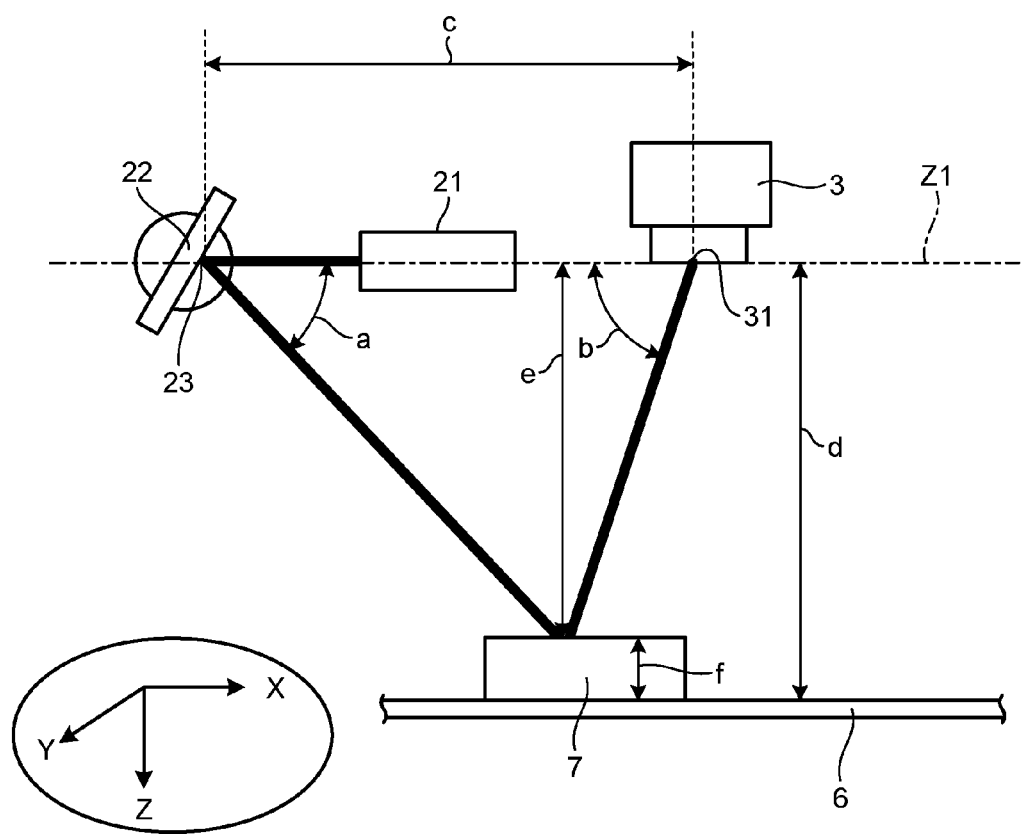
FIG. 3 is a diagram illustrating a measuring method of a three-dimensional shape according to the first embodiment.

Next, a measuring method of the three-dimensional shape of the measuring object 7 by the shape measuring unit 44 is briefly explained with reference to FIG. 3. FIG. 3 is a diagram illustrating a measuring method of a three-dimensional shape according to the first embodiment.

As shown in FIG. 3, in the three-dimensional scanner 1, the mirror 22 and the imaging unit 3 are arranged so that a reflecting position 23 of the laser LA in the mirror 22 and a light receiving position 31 of the laser LA in the imaging unit 3 are positioned on the same plane (hereinafter, described as "reference plane Z1") parallel to the stage 6.

Then, the shape measuring unit 44 calculates an irradiation angle a of the laser LA with respect to the measuring object 7 based on the rotation angle of the mirror 22. Furthermore, the shape measuring unit 44 calculates an acceptance angle b of the laser LA by the imaging unit 3 based on a laser position in an image.

A distance c from the reflecting position 23 of the laser LA in the mirror 22 to the light receiving position 31 of the laser LA in the imaging unit 3 is known, and a distance d from the reference plane Z1 to the stage 6 is also known.

Therefore, the shape measuring unit 44 can calculate a distance e from the reference plane Z1 to the top surface of the measuring object 7 by the principle of triangulation using the distance c from the reflecting position 23 of the laser LA in the mirror 22 to the light receiving position 31 of the laser LA in the imaging unit 3, and the irradiation angle a and the acceptance angle b of the laser LA.

Consequently, the shape measuring unit 44 can calculate a height f of the measuring object 7 by subtracting the distance e from the reference plane Z1 to the top surface of the measuring object 7 from the distance d from the reference plane Z1 to the stage 6. Therefore, the shape measuring unit 44 can calculate the three-dimensional shape of the measuring object 7 by calculating the height f for each portion of the measuring object 7.

Figure 4A:
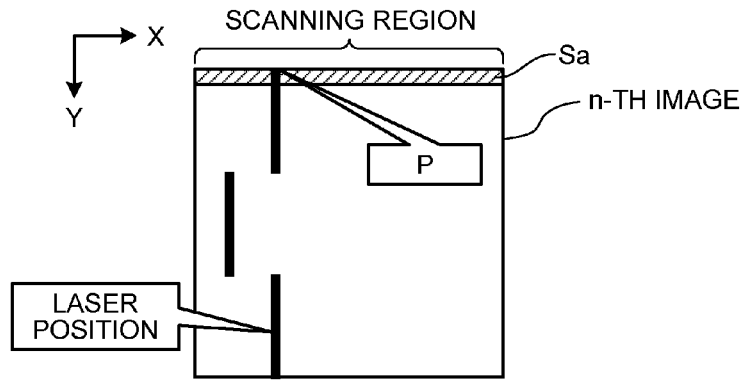
FIG. 4A to FIG. 4C are diagrams illustrating a determination example of a scanning region and a detection example of a laser position according to the first embodiment.
Figure 4B:
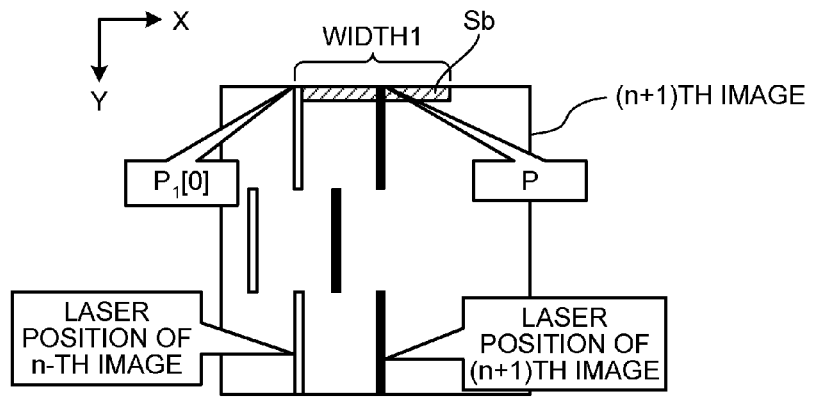
Figure 4C:
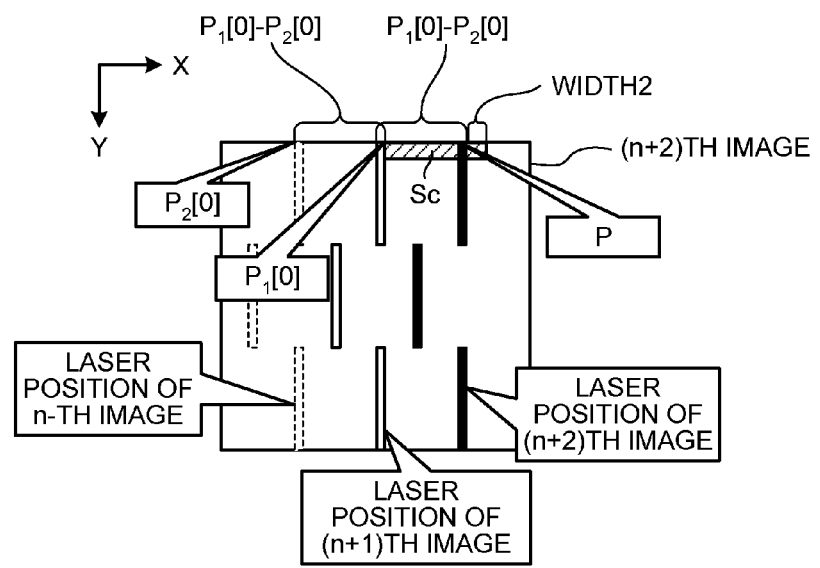

Next, a determination example of a scanning region by the scanning-region determining unit 43 and a detection example of a laser position by the position detecting unit 42 are explained with reference to FIG. 4A, FIG. 4B, and FIG. 4C. FIG. 4A, FIG. 4B, and FIG. 4C are diagrams illustrating a determination example of a scanning region and a detection example of a laser position according to the first embodiment.

As shown in FIG. 4A, an image as a scanning target is an n-th image captured by the imaging unit 3 and is a first image relating to the measuring object 7. In this case, the scanning-region determining unit 43 determines all pixels on a line (hereinafter, described as "zeroth line"), on which pixels are aligned in the X axis direction on the most negative side in the Y axis direction in the image, as a scanning region Sa of the zeroth line.

Moreover, the position detecting unit 42 scans all pixels in the scanning region Sa in the positive direction of the X axis, compares the luminance of each pixel with a predetermined threshold, and detects a position P of the brightest pixel among pixels, whose luminance exceeds the predetermined threshold, as a laser position P on the zeroth line. When there is no pixel whose luminance exceeds the predetermined threshold, it is determined that laser is not detected.

Then, in the three-dimensional scanner 1, the scanning-region determining unit 43 determines the scanning region Sa for all lines in the n-th image in the similar manner and the position detecting unit 42 detects the laser position P for all lines in the similar manner. That is, in the n-th image, all pixels included in the image are determined as the scanning region Sa by the scanning-region determining unit 43 and all pixels included in the image are scanned by the position detecting unit 42.

Moreover, as shown in FIG. 4B, an image as a scanning target is an (n+1)th image captured by the imaging unit 3 and is a second image relating to the measuring object 7. In this case, the scanning-region determining unit 43 determines a scanning region in the image (in this example, (n+1)th image) as a scanning target captured this time based on a one-frame preceding image (in this example, n-th image) that is an image captured last time.

Specifically, as shown in FIG. 4B, when determining the scanning region Sb of the zeroth line in the (n+1)th image, the scanning-region determining unit 43 determines a laser position $P_1[0]$ in the n-th image as a scanning start position in the image as a scanning target.

Then, the scanning-region determining unit 43 determines a position, which is away from the determined scanning start position by a predetermined distance WIDTH1 in the positive direction of the X axis that is the scanning direction, as a scanning end position and determines a region from the scanning start position to the scanning end position as the scanning region Sb in the zeroth line.

The predetermined distance WIDTH1 is, for example, determined by estimating a moving distance of the laser LA moving on the measuring object 7 until the (n+1)th image is captured after the n-th image is captured, based on the rotation speed of the mirror 22 and multiplying the estimated moving distance by a predetermined factor.

Then, the image-information obtaining unit 41 selectively reads out the image information 51 on luminance of each pixel in the scanning region Sb from photodetectors corresponding to the scanning region Sb and stores it in the storage unit 5. Moreover, the position detecting unit 42 scans the pixels in the scanning region Sb in the positive direction of the X axis based on the image information 51, compares the luminance of each pixel with a predetermined threshold, and detects the position P of the brightest pixel among pixels, whose luminance exceeds the predetermined threshold, as the laser position P on the zeroth line.

Then, in the three-dimensional scanner 1, the scanning-region determining unit 43 determines the scanning region Sb for each line in the (n+1)th image in the similar manner and the position detecting unit 42 detects the laser position P by scanning the pixels in the scanning region Sb on each line.

In this manner, the scanning-region determining unit 43 determines the scanning region Sb in the (n+1)th image by selecting a region in which a laser position is highly likely to be detected.

Consequently, the position detecting unit 42 becomes capable of detecting the laser position P based on the image information 51 selectively obtained from photodetectors corresponding to the scanning region Sb by the image-information obtaining unit 41, so that the laser position P can be detected in the processing time shorter than the case of detecting the laser position p by scanning all pixels of an image.

Therefore, in the three-dimensional scanner 1, the processing time required for a process of reading out the image information 51 from photodetectors and detecting the laser position p in an image can be shortened, enabling to accelerate the measuring process of a three-dimensional shape.

Moreover, as shown in FIG. 4C, an image as a scanning target is an (n+2)th image captured by the imaging unit 3 and is a third image relating to the measuring object 7. In this case, the scanning-region determining unit 43 determines a scanning region Sc in an image (in this embodiment, (n+2)th image) as a scanning target captured this time based on a one-frame-preceding image (in this embodiment, (n+1)th image), which is an image captured last time, and a two-frame-preceding image (in this embodiment, n-th image), which is an image captured immediately before the last time.

Specifically, when determining the scanning region Sc of the zeroth line in the (n+2)th image, as shown in FIG. 4C, the scanning-region determining unit 43 first determines the laser position $P_1[0]$ in the (n+1)th image as a scanning start position $P_1[0]$ in the image as a scanning target.

When a laser position in the two-frame-preceding image (n-th image) is $P_2[0]$, a distance from the laser position $P_2[0]$ in the two-frame-preceding image to the laser position $P_1[0]$ in the one-frame-preceding image is $P_1[0]-P_2[0]$.

Thus, in the (n+2)th image as a scanning target, it is possible to estimate that the laser LA is detected at a position away from the laser position $P_1[0]$ in the one-frame-preceding image by the distance $P_1[0]-P_2[0]$ in the positive direction of the X axis.

However, a laser position is displaced in the X-axis direction from an estimated position depending on the shape of the measuring object 7 in some cases. Therefore, in the case where an image as a scanning target is the (n+2)th image, the scanning-region determining unit 43 determines a position, which is away from the scanning start position $P_1[0]$ by the distance $P_1[0]-P_2[0]$+predetermined margin WIDTH2 in the positive direction of the X axis, as a scanning end position, thereby determining the scanning region Sc. WIDTH2 may be variable depending on the rotation speed of the mirror in the similar manner to WIDTH1.

In this manner, the scanning-region determining unit 43 can appropriately determine the scanning region Sc narrower than the scanning region Sb shown in FIG. 4B based on a rough prediction by using actual laser positions in an one-frame-preceding image and a two-frame-preceding image.

Then, the image-information obtaining unit 41 selectively reads out the image information 51 on luminance of each pixel in the scanning region Sc from photodetectors corresponding to the scanning region Sc and stores it in the storage unit 5.

Moreover, the position detecting unit 42 scans the pixels in the scanning region Sc in the positive direction of the X axis, compares the luminance of each pixel with a predetermined threshold, and detects the position P of the brightest pixel among pixels, whose luminance exceeds the predetermined threshold, as a laser position on the zeroth line.

Then, in the three-dimensional scanner 1, the scanning-region determining unit 43 determines the scanning region Sc for each line in the (n+2)th image in the similar manner and the position detecting unit 42 detects the laser position P by scanning the pixels in the scanning region Sc of each line.

Consequently, the position detecting unit 42 can detect the laser position P in the (n+2)th image by scanning the pixels of the scanning region Sc further narrower than the scanning region Sb in the (n+1)th image.

Therefore, in the three-dimensional scanner 1, the processing time required for a process of reading out the image information 51 from photodetectors and a process of detecting the laser position P in an image can be further shortened, so that the measuring process of a three-dimensional shape can be further accelerated.

Moreover, for (n+3)th and subsequent images captured by the imaging unit 3, the scanning-region determining unit 43 determines a scanning region in an image as a scanning target based on laser positions actually detected from an image captured last time and an image captured immediately before the last time in the similar manner to the case of the (n+2)th image. Moreover, the position detecting unit 42 detects a laser position in the (n+3)th and subsequent images in the similar manner to the case of the (n+2)th image.

A scanning region in the (n+3)th and subsequent images may be determined based on a rate of change of a difference in a laser position between two continuously-captured images. In this case, for example, the difference in a laser position between two continuous images is sequentially calculated based on the shape information 53 and the difference is stored in the storage unit 5 in a time sequence.

Then, when the difference in a laser position between two continuous images changes at a constant rate of change in a time sequence, the scanning-region determining unit 43 determines a scanning region in an image as a scanning target in consideration of the rate of change.

For example, when the difference in a laser position between two continuous images decreases at a fixed decreasing rate, the scanning-region determining unit 43 first determines a laser position of a one-frame preceding image as a scanning start position.

Then, the scanning-region determining unit 43 determines a position, which is away from the scanning start position by a distance, which is shorter than the difference in a laser position between the one-frame preceding image and a two-frame preceding image, in the scanning direction, as a scanning end position in consideration of the above-described decreasing rate of the difference. In this case, the margin WIDTH2 may be added to the determined scanning region.

Consequently, the three-dimensional scanner 1 can narrow a scanning region more appropriately, so that the processing time required for detecting a laser position of an image can be further shortened, enabling to further accelerate the measuring process of a three-dimensional shape.

Figure 5:
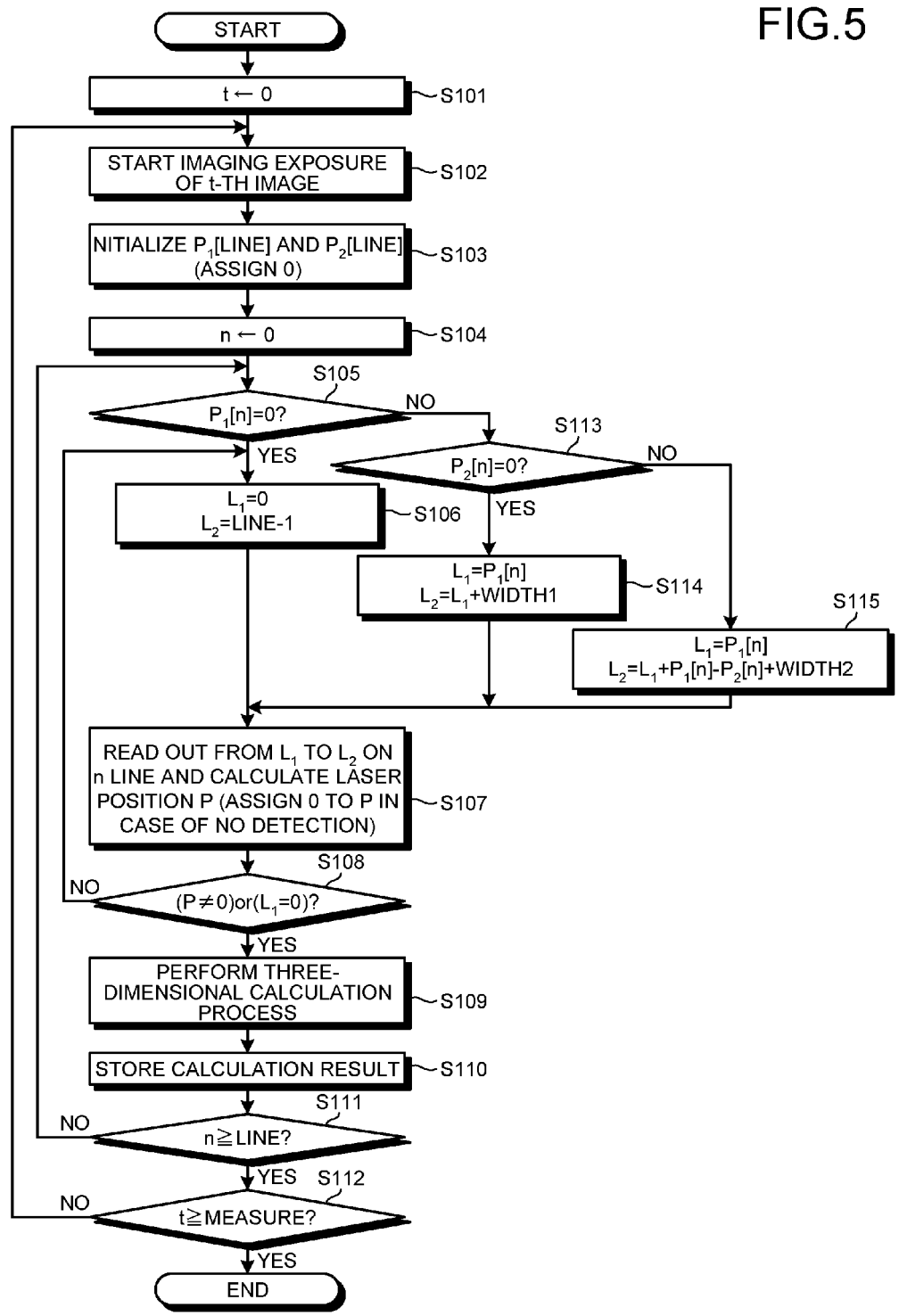
FIG. 5 is a flowchart illustrating a process performed by a control unit according to the first embodiment.

Next, a process performed by the control unit 4 is explained with reference to FIG. 5. FIG. 5 is a flowchart illustrating the process performed by the control unit 4 according to the first embodiment. MEASURE shown in FIG. 5 is the number of images obtained by imaging the measuring object 7 by the imaging unit 3 and LINE is the number of lines in an image.

Moreover, $P_1$[LINE] is a laser position in an image, which is one frame before an image as a scanning target, and $P_2$[LINE] is a laser position in an image, which is two frames before an image as a scanning target.

Moreover, $L_1$ is a scanning start position in each line and $L_2$ is a scanning end position in each line. Moreover, WIDTH1 in FIG. 5 corresponds to WIDTH1 shown in FIG. 4B and WIDTH2 in FIG. 5 corresponds to WIDTH2 shown in FIG. 4C.

In the followings, as an example, explanation is made for a case where MEASURE is 512 and LINE is 512, that is, zeroth to 511th images are captured for the measuring object 7 in a predetermined period and one image includes zeroth to 511-th lines. In one line, 512 pixels (photodetectors) are aligned in the X-axis direction. Moreover, in the followings, explanation is made for a case where the top surface of the measuring object 7 is parallel to the XY plane, that is, the height of each portion of the measuring object 7 is the same.

As shown in FIG. 5, the control unit 4 according to the first embodiment first assigns 0 to a predetermined variable t (Step S101) and captures a t-th image by causing the imaging unit 3 to start imaging exposure of the t-th image (Step S102). In other words, in this embodiment, the variable t represents an order of capturing an image as a scanning target.

Next, the control unit 4 initializes $P_1$[LINE] and $P_2$[LINE] by assigning 0 to each LINE of $P_1$[LINE] and $P_2$[LINE] (Step S103). Next, the control unit 4 assigns 0 to a predetermined variable n (Step S104). The variable n represents an order of a line as a scanning target.

Next, the control unit 4 determines whether $P_1$[n]=0 (Step S105). That is, at Step S105, the control unit 4 determines whether the laser LA is not detected in the n-th line of a one-frame preceding image.

Then, when the control unit 4 determines that the laser LA is not detected (Yes at Step S105), the control unit 4 assigns 0 to $L_1$ and LINE-1 to $L_2$ (Step S106), and moves the process to Step S107. That is, when the laser LA is not detected in the n-th line of a one-frame preceding image, the control unit 4 determines all pixels in the n-th line as the scanning region Sa (see FIG. 4A) and moves the process to Step S107.

On the other hand, when the control unit 4 determines that the laser LA has been detected in the n-th line of a one-frame preceding image (No at Step S105), the control unit 4 determines whether $P_2$[n]=0 (Step S113). That is, at Step S113, the control unit 4 determines whether the laser LA is not detected in the n-th line of a two-frame preceding image.

Then, when the control unit 4 determines that the laser LA is not detected (Yes at Step S113), the control unit 4 assigns $P_1$[n] to $L_1$ and $L_1$+WIDTH1 to $L_2$ (Step S114), and moves the process to Step S107. That is, the control unit 4 determines the scanning region Sb (see FIG. 4B) with a laser position in a one-frame preceding image as a scanning start position and a position away from the scanning start position by WIDTH1 in the positive direction of the X axis as a scanning end position, and moves the process to Step S107.

On the other hand, when the control unit 4 determines that the laser LA has been detected in the n-th line of a two-frame preceding image, (No at Step S113), the control unit 4 assigns $P_1$[n] to $L_1$ and $L_1$+$P_1$[n]−$P_2$[n]+WIDTH2 to $L_2$ (Step S115) and moves the process to Step S107.

That is, at Step S115, the control unit 4 determines the scanning region Sc (see FIG. 4C) with a laser position in a one-frame preceding image as a scanning start position and a position away from the scanning start position by $P_1$[n]−$P_2$[n]+WIDTH2 in the positive direction of the X axis as a scanning end position and moves the process to Step S107.

Then, at Step S107, the control unit 4 detects a laser position by reading out and obtaining the image information 51 from $L_1$ to $L_2$ on the n line (n-th line) from photodetectors of the imaging unit 3 and calculating the laser position P from the obtained image information 51, and moves the process to Step S108. When a laser position is not detected, the control unit 4 assigns 0 to P and moves the process to Step S108.

Next, the control unit 4 determines whether P≠0 or $L_1$≠0 (Step S108). That is, the control unit 4 determines whether a laser position can be detected or whether all pixels in the n-th line are scanned. Then, when a laser position cannot be detected and scanning is not performed on all pixels in the n-th line (No at Step S108), the control unit 4 moves the process to Step S106 and scans all pixels in the n-th line again and detects a laser position.

On the other hand, when a laser position can be detected (Yes at Step S108), the control unit 4 performs a three-dimensional calculation process (Step S109) and stores a calculation result in the storage unit 5 as the shape information 53 (Step S110). Next, after incrementing the variable n by one (not shown), the control unit 4 determines whether the variable n is equal to or more than LINE (Step S111).

Then, when the control unit 4 determines that the variable n is less than LINE (No at Step S111), the control unit 4 moves the process to Step S105. That is, the control unit 4 repeats the processes at Step S105 to Step S111 and Step S113 to Step S115 until completing scanning of all lines in one image.

On the other hand, when the control unit 4 determines that the variable n reaches LINE (Yes at Step S111), after incrementing the variable t by one (not shown), the control unit 4 determines whether the variable t is equal to or more than MEASURE (Step S112).

When the control unit 4 determines that the variable t is less than MEASURE (No at Step S112), the control unit 4 moves the process to Step S102. That is, the control unit 4 repeats the processes at Step S102 to Step S115 until completing scanning of images of all frames. On the other hand, when the control unit 4 determines that the variable t reaches MEASURE (Yes at Step S112), the control unit 4 ends the process.

Next, explanation is made for correction of a scanning region performed by the scanning-region determining unit 43 when the top surface of the measuring object 7 is not parallel to the XY plane with reference to FIG. 6A, FIG. 6B, FIG. 6C, FIG. 7A, FIG. 7B, and FIG. 7C. FIG. 6A, FIG. 6B, FIG. 6C, FIG. 7A, FIG. 7B, and FIG. 7C are explanatory diagrams of a correcting method of a scanning region by the scanning-region determining unit 43.

In FIG. 6A, FIG. 6B, FIG. 6C, FIG. 7A, FIG. 7B, and FIG. 7C, the components same as those shown in FIG. 3 are denoted by the same reference numerals. Moreover, in the followings, a case where the rotation speed of the mirror 22 is constant and the time interval of imaging by the imaging unit 3 is constant is explained.

Figure 6A:
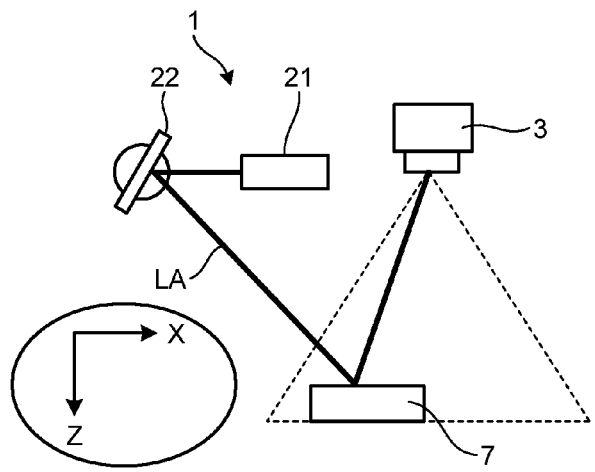
FIG. 6A to FIG. 6C and FIG. 7A to FIG. 7C are explanatory diagrams of a correcting method of a scanning region by a scanning-region determining unit according to the first embodiment.
Figure 7A:
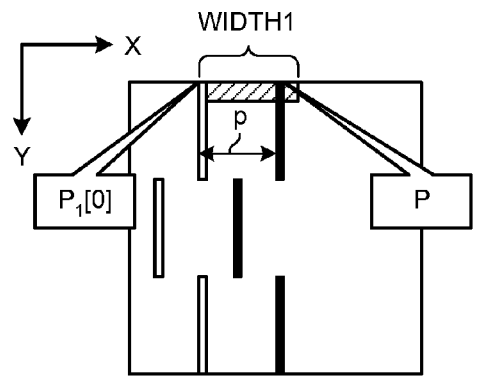

As shown in FIG. 6A, when the top surface of the measuring object 7 is not parallel to the XY plane, as shown in FIG. 7A, the scanning-region determining unit 43 determines the laser position $P_1[0]$ in a one-frame preceding image as a scanning start position in an image as a scanning target. Then, the scanning-region determining unit 43 determines the position P away from the scanning start position by the predetermined distance WIDTH1 in the positive direction of the X axis as a scanning end position.

Figure 6B:
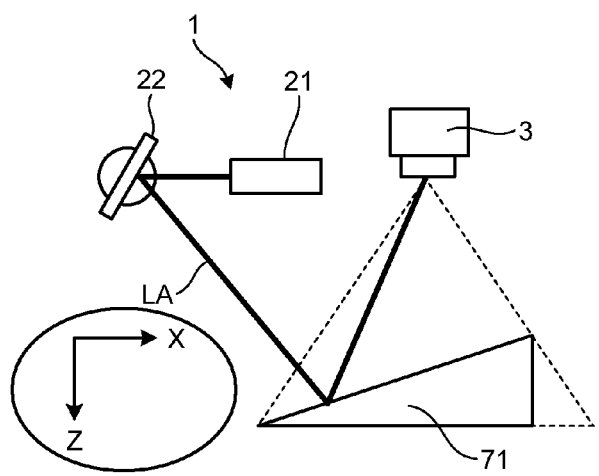

On the contrary, as shown in FIG. 6B, in the case of a measuring object 71 whose height in the Z-axis direction becomes higher toward the positive direction of the X axis, the moving speed of the laser LA on the measuring object 71 becomes slow compared with the measuring object 7 shown in FIG. 6A.

Figure 7B:
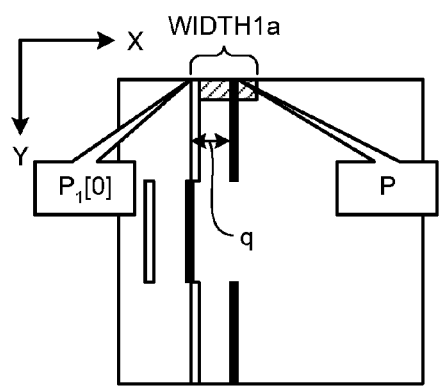

Therefore, as shown in FIG. 7B, in the case of the measuring object 71 whose height in the Z-axis direction becomes higher toward the positive direction of the X axis, a distance q between the laser position $P_1[0]$ in a one-frame preceding image and the laser position P in an image as a scanning target becomes shorter than a distance p shown in FIG. 7A.

Thus, the scanning-region determining unit 43 determines whether an object is the measuring object 71, whose height in the Z-axis direction becomes higher toward the positive direction of the X axis, based on the shape information 53 on a portion, whose shape has been measured, among the portions of the measuring object 71.

Then, in the case of the measuring object 71 whose height in the Z-axis direction becomes higher toward the positive direction of the X axis, the scanning-region determining unit 43 performs correction of determining a region from the laser position $P_1[0]$ in a one-frame preceding image to a position away from the laser position $P_1[0]$ by a distance WIDTH1a, which is shorter than the predetermined distance WIDTH1 in the positive direction of the X axis, as a scanning region.

Figure 6C:
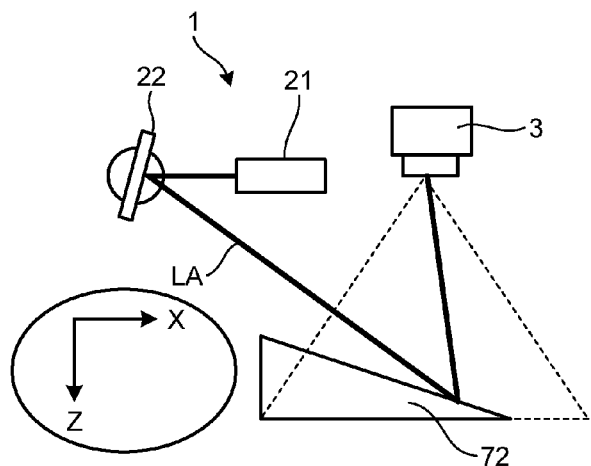

On the other hand, as shown in FIG. 6C, in the case of a measuring object 72 whose height in the Z-axis direction becomes smaller toward the positive direction of the X axis, the moving speed of the laser LA on the measuring object 72 becomes fast compared with the measuring object 7 shown in FIG. 6A.

Figure 7C:
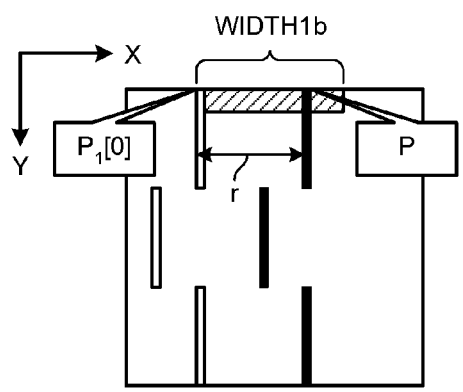

Therefore, as shown in FIG. 7C, in the case of the measuring object 72 whose height in the Z-axis direction becomes smaller toward the positive direction of the X axis, a distance r between the laser position $P_1[0]$ in a one-frame preceding image and the laser position P in an image as a scanning target becomes longer than the distance p shown in FIG. 7A.

Thus, the scanning-region determining unit 43 determines whether an object is the measuring object 72, whose height in the Z-axis direction becomes smaller toward the positive direction of the X axis, based on the shape information 53 on a portion, whose shape has been measured, among the portions of the measuring object 72.

Then, in the case of the measuring object 72 whose height in the Z-axis direction becomes smaller toward the positive direction of the X axis, the scanning-region determining unit 43 performs correction of determining a region from the laser position $P_1[0]$ in a one-frame preceding image to a position away from the laser position $P_1[0]$ by a distance WIDTH1b, which is longer than the predetermined distance WIDTH1 in the positive direction of the X axis, as a scanning region.

In this manner, in the three-dimensional scanner 1, because the scanning-region determining unit 43 appropriately corrects a scanning region according to the height of the measuring object 7, 71, or 72 in the Z-axis direction, the position detecting unit 42 can detect the laser position P in an image without scanning unnecessary pixels. Therefore, in the three-dimensional scanner 1, the measuring process of a three-dimensional shape can be accelerated by appropriately shortening the processing time required for the detecting process of the laser position P.

The scanning-region determining unit 43 may be configured to correct a scanning region even when the height of each portion in the measuring object 7 is the same. For example, when the length of the measuring object 7 in the X-axis direction exceeds a predetermined length, the moving speed of the laser LA becomes high as an irradiation position of the laser LA on the measuring object 7 moves in the positive direction of the X axis, which cannot be ignored in some cases.

In this case, the scanning-region determining unit 43 performs correction of extending a scanning region in the scanning direction as an irradiation position of laser on the measuring object 7 moves in the positive direction of the X-axis. With this correction, even when the length of the measuring object 7 in the X-axis direction exceeds a predetermined length, an appropriate scanning region can be determined, so that a laser position in an image can be appropriately detected.

(Second Embodiment)

Next, the second embodiment of a robot system including the three-dimensional scanner 1 is explained with reference to FIG. 8.

Figure 8:
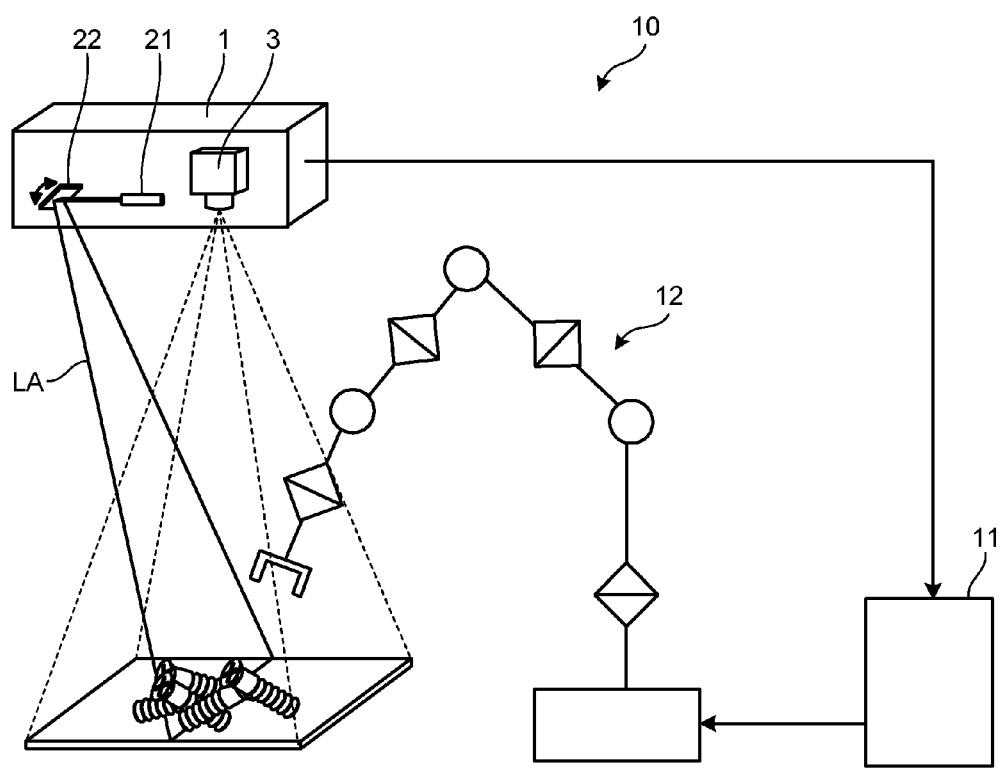
FIG. 8 is a diagram illustrating a robot system according to a second embodiment.

FIG. 8 is a diagram illustrating a robot system 10 according to the embodiment. In the followings, explanation is made for the robot system 10 that causes a robot to identify workpieces piled up in bulk and perform a work using the identified workpieces. In FIG. 8, screws are illustrated as an example of the workpieces, however, the workpieces are not limited to screws and may be any member such as bolts and nuts.

As shown in FIG. 8, the robot system 10 includes the three-dimensional scanner 1, a robot control apparatus 11, and a robot 12. The three-dimensional scanner 1 is similar to that explained in the first embodiment and is arranged vertically above the stacked workpieces and measures the three-dimensional shape of the workpieces.

The robot control apparatus 11 is connected to the three-dimensional scanner 1 and the robot 12 and obtains the shape information 53 (see FIG. 2) on the workpieces piled up in bulk from the three-dimensional scanner 1. Next, the robot control apparatus 11 determines the position and the orientation of a workpiece as a work target from the workpieces piled in bulk and outputs a determination result to the robot 12.

The robot 12 includes a robot hand, which grips a workpiece, at the tip end of a robot arm having joints of seven axes. The robot 12, for example, performs a work of gripping a workpiece by driving the robot arm and the robot hand based on the position and the orientation of the workpiece as a work target input from the robot control apparatus 11 and attaching the workpiece to a predetermined member.

In the robot system 10, a scanning region in an image as a scanning target is appropriately determined narrow based on an image of workpieces captured by the three-dimensional scanner 1 before an image as a scanning target in the similar manner to the first embodiment and the three-dimensional shape of the workpieces is measured by scanning pixels of the determined scanning region.

Consequently, the robot control apparatus 11 can promptly detect the position and the orientation of a workpiece as a work target from the three-dimensional shape of workpieces measured by an accelerated shape measuring process by the three-dimensional scanner 1 and output it to the robot 12.

Therefore, according to the robot system 10, it is possible to shorten the working time by the robot 12 by shortening the processing time until gripping a workpiece by the robot 12 after starting shape measurement of workpieces by the three-dimensional scanner 1, enabling to improve work efficiency.

Moreover, in the robot system 10, positional information indicting the position of a workpiece as a work target output from the robot control apparatus 11 to the robot 12 may be output to the three-dimensional scanner 1 and the content of the measuring process by the three-dimensional scanner 1 may be changed based on the positional information.

That is, when a specific workpiece is picked up by the robot 12 from stacked workpieces, the shape of the stacked workpieces changes in a region from which the workpiece is picked up, however, in a region from which the workpiece is not picked up, the shape of the stacked workpieces does not change in some cases.

In this case, the three-dimensional scanner 1, for example, determines a scanning region in the similar manner to the first embodiment for the region from which a workpiece as a work target is picked up by the robot 12, and, for a region other than the region from which the workpiece is picked up, determines a predetermined region around a laser position in an image captured before the workpiece is picked up as a scanning region.

Consequently, in the robot system 10, the processing time for measuring a three-dimensional shape can be further shortened by further reducing the number of pixels to be scanned by the position detecting unit 42 of the three-dimensional scanner 1, so that work efficiency of the robot 12 can be further improved.

In the second embodiment, the three-dimensional scanner 1 and the robot 12 are separately provided, however, the three-dimensional scanner 1 may be provided integrally on the tip end of the robot arm of the robot 12.

With this configuration, the robot control apparatus 11 moves the three-dimensional scanner 1 to a position at which the shape of a workpiece as a work target can be measured by driving the robot arm every time the robot 12 finishes a workpiece attaching work. With this configuration, the arrangement space of the robot system 10 can be saved.

Moreover, in the above first and second embodiments, explanation is made for the case of limiting photodetectors from which the image information 51 is read out by the scanning-region determining unit 43, however, the image information 51 to be a detecting target of a laser position may be limited by the scanning-region determining unit 43.

With this configuration, the image-information obtaining unit 41 reads out the image information 51 from all photodetectors included in the imaging unit 3 and stores it in the storage unit 5. Moreover, the scanning-region determining unit 43 determines a scanning region shown in FIG. 1B, FIG. 1C, FIG. 4A, FIG. 4B, and FIG. 4C and outputs it to the position detecting unit 42.

Then, the position detecting unit 42 reads out the image information 51 corresponding to a scanning region input from the scanning-region determining unit 43 from the storage unit 5 and selectively scans an image of a portion corresponding to the scanning region to detect a laser position in the image as a scanning target.

In this manner, the processing time required for a detecting process of a laser position can be shortened by limiting the image information 51 to be a detecting target of a laser position by the scanning-region determining unit 43, so that the measuring process of a three-dimensional shape can be accelerated.

Moreover, in the above first and second embodiments, explanation is made for the case where the irradiation unit 2 emits the laser LA while changing an irradiation position with respect to the measuring objects 7, 71, and 72, however, the laser LA may be moved on the measuring objects 7, 71, and 72 without changing an irradiation position.

In this case, for example, the laser LA can be moved on the measuring objects 7, 71, and 72 without changing an irradiation position by emitting the laser LA to the measuring objects 7, 71, and 72 while moving the laser device 21 in a direction parallel to the XY plane.

Moreover, in the above first and second embodiments, a scanning region in an image as a scanning target is determined based on an image captured before the image as a scanning target, however, a scanning region is not necessarily determined based on an image captured before the image as a scanning target.

For example, when the measuring objects 7, 71, and 72 are known objects, a laser position in an image of the measuring objects 7, 71, and 72 can be roughly predicted based on the type of the object. Therefore, in this case, a scanning region (see scanning region shown in FIG. 1B, FIG. 1C, FIG. 4A, FIG. 4B, and FIG. 4C) for each of the measuring objects 7, 71, and 72 determined in advance based on the above roughly predicted laser position is stored in the storage unit 5 for each line in an image.

Then, when photodetectors from which the image information 51 is read out are limited by the scanning-region determining unit 43, the image-information obtaining unit 41 selectively reads out the image information 51 from photodetectors corresponding to the scanning region stored in the storage unit 5, and the image-information obtaining unit 41 detects a laser position for each line of an image from the image information 51.

Moreover, when the image information 51 to be a detecting target of a laser position is limited by the scanning-region determining unit 43, the position detecting unit 42 detects a laser position in an image as a scanning target by selectively scanning an image of a portion corresponding to a scanning region based on the image information 51 corresponding to the scanning region stored in the storage unit 5.

With this configuration, the three-dimensional scanner can detect a laser position in an image without performing a determining process of a scanning region. Moreover, the three-dimensional scanner can detect a laser position for each line of an image.

Therefore, according to the three-dimensional scanner, detection accuracy of a laser position in an image can be improved by performing fine scanning for each line of an image, so that the time required for the measuring process of a three-dimensional shape can be shortened by the time of omitted determining process of a scanning region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional scanner comprising:
   a laser configured to emit a slit-shaped light beam;
   a reflective plate configured to reflect the light beam emitted from the laser to change an irradiation position of the light beam on a measuring object by rotating a reflective surface of the reflective plate;
   an imaging sensor configured to sequentially capture images of the measuring object while the laser emits the light beam on the measuring object;
   an image-information obtaining unit configured to obtain the images captured by the imaging sensor and to store the images in a storage unit;
   a position detecting unit configured to detect, by scanning a first image among images stored in the storage unit, a position of the light beam in the first image; and
   a scanning-region determining unit configured to determine a scanning region in the first image based on a position of the light beam in a second image captured immediately before the first image by the imaging sensor, wherein
   the position detecting unit scans the first image while sequentially moving a scanning start position in each scanning in a scanning direction, which is a moving direction of the light beam on the first image by changing of the irradiation position, in a direction orthogonal to the scanning direction, and
   the scanning-region determining unit determines the scanning region for each scanning in the scanning direction, determines a position of the light beam in the second image as the scanning start position in the first image, and determines a position, which is away from the scanning start position in the first image by a predetermined distance in the scanning direction, as a scanning end position.

2. The three-dimensional scanner according to claim 1, wherein the scanning-region determining unit determines the predetermined distance based on a distance between a position of the light beam in the second image and a position of the light beam in an image captured immediately before the second image by the imaging sensor.

3. The three-dimensional scanner according to claim 1, wherein the scanning-region determining unit, when a height representing a distance in a normal direction in the second image of the measuring object increases toward the scanning direction, determines the predetermined distance to be shorter than a case where the height does not change, and, when the height decreases toward the scanning direction, determines the predetermined distance to be longer than a case where the height does not change.

4. A three-dimensional scanner comprising:
   a laser configured to emit a slit-shaped light beam;
   a reflective plate configured to reflect the light beam emitted from the laser to change an irradiation position of the light beam on a measuring object by rotating the reflective surface of the reflective plate;
   an imaging sensor configured to include a plurality of photodetectors arranged on a light receiving surface that receives light from the measuring object and to sequentially capture images of the measuring object while the laser emits the light beam on the measuring object;
   an image-information obtaining unit configured to obtain the images captured by the imaging sensor and to store the images in a storage unit as image information;
   a position detecting unit configured to detect, by scanning a first image among the images stored in the storage unit, a position of the light beam in the first image; and
   a scanning-region determining unit configured to determine a scanning region in the first image based on a position of the light beam in a second image captured immediately before the first image by the imaging sensor, wherein
   the position detecting unit scans the first image while sequentially moving a scanning start position in each scanning in a scanning direction, which is a moving direction of the light beam on the first image by changing of the irradiation position, in a direction orthogonal to the scanning direction, and
   the scanning-region determining unit determines the scanning region for each scanning in the scanning direction, determines a position of the light beam in the second image as the scanning start position in the first image, and determines a position, which is away from the scanning start position in the first image by a predetermined distance in the scanning direction, as a scanning end position.

5. A robot system comprising:
   a three-dimensional scanner that includes
      a laser configured to emit a slit-shaped light beam,
      a reflective plate configured to reflect the light beam emitted from the laser to change an irradiation position of the light beam on a workpiece by rotating the reflective surface of the reflective plate,
      an imaging sensor configured to sequentially capture images of the workpiece while the laser emits the light beam on the workpiece,
      an image-information obtaining unit configured to obtain the images captured by the imaging sensor and to store the images in a storage unit;
      a position detecting unit configured to detect, by scanning a first image among the images stored in the storage unit, a position of the light beam in the first image, and
      a scanning-region determining unit configured to determine a scanning region in the first image based on a position of the light beam in a second image captured immediately before the first image by the imaging sensor;
   a robot control apparatus that obtains information on a three-dimensional shape of the workpiece from the three-dimensional scanner and outputs the information and a work order for the workpiece to a robot; and
   a robot that identifies the workpiece as a work target based on the information and the work order input from the robot control apparatus and performs a work, wherein
   the position detecting unit scans the first image while sequentially moving a scanning start position in each scanning in a scanning direction, which is a moving direction of the light beam on the first image by changing of the irradiation position, in a direction orthogonal to the scanning direction, and the scanning-region determining unit determines the scanning region for each scanning in the scanning direction, determines a position of the light beam in the second image as the scanning start position in the first image, and determines a position, which is away from the scanning start position in the first image by a predetermined distance in the scanning direction, as a scanning end position.

6. A three-dimensional scanner comprising:

a laser configured to emit a slit-shaped light beam;

a reflective plate configured to reflect the light beam emitted from the laser to change an irradiation position of the light beam on a measuring object by rotating a reflective surface of the reflective plate;

an imaging sensor configured to sequentially capture images of the measuring object while the laser emits the light beam on the measuring object;

an image-information obtaining unit configured to obtain the images captured by the imaging sensor and to store the images in a storage unit;

a position detecting unit configured to detect, by scanning a first image among the images stored in the storage unit, a position of the light beam in the first image; and a scanning-region determining unit configured to determine a scanning region in the first image based on a position of the light beam in a second image captured immediately before the first image by the imaging sensor, wherein the position detecting unit scans the first image in a scanning direction which is a moving direction of the light beam on the first image by changing of the irradiation position, and the scanning-region determining unit, when a height representing a distance in a normal direction in the second image of the measuring object increases toward a scanning direction, determines a predetermined distance of the scanning region in the scanning direction to be shorter than a case where the height does not change, and, when the height decreases toward the scanning direction, determines the predetermined distance to be longer than a case where the height does not change.

7. A three-dimensional scanner comprising:

an irradiation unit including a laser configured to emit a slit-shaped light beam, and to move the laser to change an irradiation position of the light beam irradiated on a measuring object;

an imaging sensor configured to sequentially capture images of the measuring object while the irradiation unit emits the light beam on the measuring object;

an image-information obtaining unit configured to obtain the images captured by the imaging sensor and to store the images in a storage unit;

a position detecting unit configured to detect, by scanning a first image among the images stored in the storage unit, a position of the light beam in the first image; and a scanning-region determining unit configured to determine a scanning region in the first image based on a position of the light beam in a second image captured immediately before the first image by the imaging sensor, wherein the position detecting unit scans the first image while sequentially moving a scanning start position in each scanning in a scanning direction, which is a moving direction of the light beam on the first image by changing of the irradiation position, in a direction orthogonal to the scanning direction, and the scanning-region determining unit determines the scanning region for each scanning in the scanning direction, determines a position of the light beam in the second image as the scanning start position in the first image, and determines a position, which is away from the scanning start position in the first image by a predetermined distance in the scanning direction, as a scanning end position.

\* \* \* \* \*

UNITED STATES PATENT AND TRADEMARK OFFICE
CERTIFICATE OF CORRECTION

PATENT NO. : 8,929,642 B2
APPLICATION NO. : 13/412556
DATED : January 6, 2015
INVENTOR(S) : Yuji Ichimaru Page 1 of 1

It is certified that error appears in the above-identified patent and that said Letters Patent is hereby corrected as shown below:

On the Title page, Item (73), "Kabushiki Kaisha Yasakawa Denki" should be changed to
--Kabushiki Kaisha Yaskawa Denki--.

Signed and Sealed this
Twenty-fourth Day of November, 2015

Michelle K. Lee
*Director of the United States Patent and Trademark Office*